（12）United States Patent
Mitsushima et al.

(10) Patent No.: US 11,236,428 B2
(45) Date of Patent: *Feb. 1, 2022

(54) ELECTROLYTIC CELL FOR PRODUCTION OF ORGANIC CHEMICAL HYDRIDES

(71) Applicants: NATIONAL UNIVERSITY CORPORATION YOKOHAMA NATIONAL UNIVERSITY, Yokohama (JP); De Nora Permelec Ltd., Fujisawa (JP)

(72) Inventors: Shigenori Mitsushima, Yokohama (JP); Yasutomo Takakuwa, Yokohama (JP); Yoshinori Nishiki, Fujisawa (JP); Akihiro Kato, Fujisawa (JP); Akiyoshi Manabe, Fujisawa (JP)

(73) Assignees: NATIONAL UNIVERSITY CORPORATION YOKOHAMA NATIONAL UNIVERSITY, Yokohama (JP); DE NORA PERMELEC LTD., Fujisawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/514,403

(22) PCT Filed: Sep. 18, 2015

(86) PCT No.: PCT/JP2015/076769
§ 371 (c)(1),
(2) Date: Mar. 24, 2017

(87) PCT Pub. No.: WO2016/047629
PCT Pub. Date: Mar. 31, 2016

(65) Prior Publication Data
US 2017/0292198 A1 Oct. 12, 2017

(30) Foreign Application Priority Data
Sep. 25, 2014 (JP) .............................. JP2014-195202

(51) Int. Cl.
*C25B 9/23* (2021.01)
*C25B 11/02* (2021.01)
(Continued)

(52) U.S. Cl.
CPC .................. *C25B 9/23* (2021.01); *C25B 3/25* (2021.01); *C25B 11/02* (2013.01); *C25B 11/043* (2021.01);
(Continued)

(58) Field of Classification Search
None
See application file for complete search history.

(56) References Cited

U.S. PATENT DOCUMENTS 4,367,126 A 1/1983 Sato et al.
4,426,271 A 1/1984 Yoshida et al.
(Continued)

FOREIGN PATENT DOCUMENTS

CN 101333667 A 12/2008
CN 103031565 A 4/2013
(Continued)

OTHER PUBLICATIONS

Machine translation of JP S56-145927 obtained from http://worldwide.espacenet.com on Nov. 8, 2018 (Year: 1981).*
(Continued)

*Primary Examiner* — Harry D Wilkins, III
(74) *Attorney, Agent, or Firm* — Birch, Stewart, Kolasch & Birch, LLP

(57) ABSTRACT

To provide an electrolysis cell for producing an organic chemical hydride capable of advancing a reduction reaction in a cathode of an organic compound having an unsaturated bond with high current efficiency and a small electric power consumption unit.
An electrolysis cell 10 for producing an organic chemical hydride includes a solid polymer electrolyte film 11 which
(Continued)

has proton conductivity; a cathode 12 which is provided on one surface of the solid polymer electrolyte film 11 and generates a hydride by reducing a substance to be hydrogenated; a cathode chamber 13 which accommodates the cathode 12 and to which the substance to be hydrogenated is supplied; an electrode catalyst-containing anode 14 which is provided on another surface of the solid polymer electrolyte film 11 and generates a proton by oxidizing water; and an anode chamber 15 which accommodates the anode 14 and to which an electrolytic solution is supplied, in which at least one of a surface of the cathode 12 side and a surface of the anode 14 side of the solid polymer electrolyte film 11 is hydrophilized.

3 Claims, 2 Drawing Sheets

(51) Int. Cl.
- *C25B 3/25* (2021.01)
- *C25B 11/043* (2021.01)
- *C25B 11/051* (2021.01)
- *C25B 11/073* (2021.01)
- *C25B 11/077* (2021.01)

(52) U.S. Cl.
CPC .......... *C25B 11/051* (2021.01); *C25B 11/073* (2021.01); *C25B 11/077* (2021.01)

(56) References Cited

U.S. PATENT DOCUMENTS

| | | | |
|---|---|---|---|
| 4,552,631 A | 11/1985 | Bissot et al. | |
| 5,087,345 A | 2/1992 | Kashiwada et al. | |
| 6,218,556 B1* | 4/2001 | Pintauro | C11C 3/12 204/167 |
| 6,238,530 B1* | 5/2001 | Yoshida | C07C 5/03 204/252 |
| 6,802,875 B1 | 10/2004 | Kimbara et al. | |
| 10,202,698 B2* | 2/2019 | Mitsushima | C25B 13/08 |
| 2008/0234527 A1 | 9/2008 | Matsumoto et al. | |
| 2009/0000574 A1 | 1/2009 | Sugimasa et al. | |
| 2009/0025291 A1 | 1/2009 | Ichikawa et al. | |
| 2013/0087451 A1 | 4/2013 | Hirashige et al. | |
| 2013/0313127 A1 | 11/2013 | Sato et al. | |
| 2014/0110268 A1 | 4/2014 | Jackson et al. | |
| 2014/0144774 A1* | 5/2014 | Hirashige | C25B 3/04 204/252 |
| 2016/0177460 A1* | 6/2016 | Sato | C25B 1/04 204/230.2 |
| 2016/0281246 A1* | 9/2016 | Lilga | C25B 3/04 |
| 2017/0130344 A1* | 5/2017 | Mitsushima | C25B 1/04 |
| 2019/0264340 A1* | 8/2019 | Mitsushima | C25B 15/08 |

FOREIGN PATENT DOCUMENTS

| | | |
|---|---|---|
| JP | 56-75583 A | 6/1981 |
| JP | 56-145927 A | 11/1981 |
| JP | 56-152980 A | 11/1981 |
| JP | 57-39185 A | 3/1982 |
| JP | 57-89488 A | 6/1982 |
| JP | 57-198285 A | 12/1982 |
| JP | 57-198286 A | 12/1982 |
| JP | 59-219487 A | 12/1984 |
| JP | 3-137136 A | 6/1991 |
| JP | 2003-221691 A | 8/2003 |
| JP | 2007-265936 A | 10/2007 |
| JP | 2014-69716 A | 4/2014 |
| WO | WO 2012/091128 A1 | 7/2012 |
| WO | WO 2013/134220 A1 | 9/2013 |

OTHER PUBLICATIONS

Chinese Office Action and Search Report for Chinese Application No. 201580051360.7, dated Jan. 19, 2018.
International Search Report for PCT/JP2015/076769 (PCT/ISA/210) dated Dec. 15, 2015.
Soda Technology Handbook, 2009, Japan Soda Industry Association, p. 58.
Extended European Search Report for Application No. 15845341.5, dated May 2, 2018.

* cited by examiner

ELECTROLYTIC CELL FOR PRODUCTION OF ORGANIC CHEMICAL HYDRIDES

TECHNICAL FIELD

The present invention relates to an electrolysis cell for producing an organic chemical hydride (hereinafter, also simply referred to as "electrolysis cell"), and specifically to an electrolysis cell for producing an organic chemical hydride capable of advancing a reduction reaction in a cathode of an organic compound having an unsaturated bond with high current efficiency and in a small electric power consumption unit.

BACKGROUND ART

The power consumption amount of Japan is approximately 1,000 TWh for a year, but since thermal power generation currently covers the amount of nuclear power, the ratio of the thermal power generation reaches 90%. Meanwhile, as new energy for suppressing the emission amount of carbon dioxide, the spread of renewable energy such as solar light, wind power, water power, or geothermal power generation has been demanded, but the amount of generated power thereof is only approximately 1% with respect to the total amount. Japan is rich in water resources, but Japan relies on transport and storage of energy from overseas under the current situation because it is hard to say that Japan is an appropriate site for solar light or wind power. In addition, relaxation of short-period output fluctuation using wind power generation and large-scale solar power generation has been considered, but application to relaxation of middle or long-period output fluctuation or large-scale energy transport is difficult. For this reason, it is considered that conversion of electric power obtained from renewable energy into chemical energy is effective. A process of directly converting electric power into chemical energy is an electrochemical system, and a secondary battery, which is a so-called storage battery, is a device of storing electric power through conversion into chemical energy and widely used.

As a system based on the renewable energy, a system of disposing a large-scale solar power generation system or wind power generation system on an appropriate site in the world, converting the energy into an energy carrier to be transport, and consuming the energy inside the country is desirable. As an energy carrier, liquid hydrogen, ammonia, an organic chemical hydride, or the like is considered. However, hydrogen has a disadvantage that hydrogen is gas at room temperature and normal pressure and a special tanker is indispensable for transportation and storage. In such a state, an organic chemical hydride using hydrocarbon such as cyclohexane, methyl cyclohexane, or decalin which can be a replacement for transporting and storing hydrogen has been attracting attention.

When a liquid having a property similar to petroleum is selected as an organic chemical hydride, there is an advantage that an affinity with a relatively large-scale system is excellent and delivering to a terminal of an energy system is easy. That is, the organic chemical hydride is a liquid at room temperature and normal pressure and easy to handle, and storage and transportation of organic chemical hydride as an energy carrier instead of hydrogen is possible through hydrogenation or dehydrogenation electrochemically.

In the related art, an organic chemical hydride such as methyl cyclohexane is produced by producing hydrogen in water electrolysis using renewable energy and hydrogenating toluene in a hydrogenation reactor to be converted into methyl cyclohexane. However, the process can be simplified through direct hydrogenation using an electrolytic synthesis method. Further, in regard to an electrolytic producing method of an organic chemical hydride, efficiency loss is small regardless of the scale and follow-up at the time of start or stop is excellent. In addition, in a base of the renewable energy having a relatively small scale with efficiency which can be easily decreased in a system having a high temperature process, it is possible to perform energy conversion in a manner in which efficiency is prioritized such that energy of organic chemical hydride can be stored and transported.

Various studies have been intensively conducted on a technology using such organic chemical hydride. For example, in Patent Documents 1 and 2, an electrolysis cell that reduces an organic compound having an unsaturated bond has been proposed. In Patent Documents 3 and 4, an apparatus that produces hydrogen from an organic compound using a film separation apparatus has been proposed. Further, in Patent Document 5, an apparatus that produces hydrogen from an organic compound and supplies the produced hydrogen to a fuel cell has been proposed. Moreover, in Patent Documents 6 and 7, a method of electrolytic oxidation and reduction of an organic compound has been proposed.

Meanwhile, in a brine electrolysis industry, chlorine gas, sodium hydroxide, and hydrogen are produced at the same time by performing electrolysis on salt in a two-chamber electrolysis cell of a diaphragm. However, since it is necessary that an electrode and a diaphragm are arranged to be adjacent to each other and electrolysis voltage is reduced, a so-called bubble effect in which bubbles are adhered to a surface of a film having hydrophobicity, the current is shielded to inhibit substance movement, and an increase in cell voltage is caused is known. Particularly, it is known that generated hydrogen and chlorine gas are easily adhered to a fluorine-based ion-exchange film as bubbles, and an electrolysis voltage is increased due to the influence of bubbles and hydrogen rather than chlorine is easily adhered to a film when the distance between an electrode and a film is decreased to 2 mm or less (Non-patent Document 1). In order to solve the above-described problem, reduction in electrolysis voltage is realized by hydrophilizing the surface of a diaphragm, suppressing adhesion to the diaphragm of generated bubbles, and preventing bubbles from remaining in the vicinity of the electrode and the diaphragm (for example, Patent Documents 8 to 13).

RELATED ART DOCUMENTS

Patent Documents

Patent Document 1: Japanese Patent Application No. 2014-069716
Patent Document 2: WO2012/091128
Patent Document 3: US2008/234527A
Patent Document 4: US2009/025291A
Patent Document 5: U.S. Pat. No. 6,802,875B
Patent Document 6: US2014/110268A
Patent Document 7: WO13/134220A1
Patent Document 8: Japanese Unexamined Patent Application Publication No. 1981-075583
Patent Document 9: Japanese Unexamined Patent Application Publication No. 1981-145927
Patent Document 10: Japanese Unexamined Patent Application Publication No. 1981-152980

Patent Document 11: Japanese Unexamined Patent Application Publication No. 1982-039185

Patent Document 12: Japanese Unexamined Patent Application Publication No. 1984-219487

Patent Document 13: Japanese Unexamined Patent Application Publication No. 1991-137136

Non Patent Document

Non-patent Document 1: Soda Technology Handbook 2009, page 58, Japan Soda Industry Association

SUMMARY OF THE INVENTION

Problems To Be Solved By The Invention

In production of organic chemical hydride, it is necessary to use an electrolyte film for completely separating an anode chamber solution which is an aqueous solution from a cathode chamber solution which is an organic compound. In an electrolysis organic chemical hydride method so far, oxygen gas generated in an anode or hydrogen gas generated in a cathode by the side reaction is adhered to the electrolyte film so that ununiformity in current is locally generated, reduction of an unsaturated organic substance at the cathode, which is target of this reaction, is prevented, and voltage loss is caused by that. As an example of a reduction reaction of an organic compound having an unsaturated bond when organic chemical hydride is produced, reduction synthesis formulae of methyl cyclohexane (MCH) using toluene (TL) as a row material are shown below.

Cathodic reaction: $TL+6H^++6e^-\rightarrow MCH$
Anodic reaction: $2H_2O\rightarrow 4H^++4e^-+O_2$
Total reaction: $2TL+6H_2O\rightarrow 2MCH+3O_2$ As described above, a bubble effect occurs in the electrolysis cell for producing an organic chemical hydride similarly to brine electrolysis. However, research on whether a film surface treatment technology of the brine electrolysis is effective in an electrolysis process other than the brine electrolysis has not been made. Particularly, voltage loss due to the bubble effect is significant at the time of the high current.

An object of the present invention is to provide an electrolysis cell for producing an organic chemical hydride capable of advancing a reduction reaction in a cathode of an organic compound having an unsaturated bond with high current efficiency and a small electric power consumption unit.

Means For Solving The Problems

As a result of intensive research for solving the above-described problems, the present inventors found that the problems can be solved by setting the surface of the electrolyte film to have a predetermined structure, thereby completing the present invention.

That is, there is provided an electrolysis cell for producing an organic chemical hydride including: a solid polymer electrolyte film which has proton conductivity; a cathode which is provided on one surface of the solid polymer electrolyte film and generates a hydride by reducing a substance to be hydrogenated; a cathode chamber which accommodates the cathode and to which the substance to be hydrogenated is supplied; an electrode catalyst-containing anode which is provided on another surface of the solid polymer electrolyte film and generates a proton by oxidizing water; and an anode chamber which accommodates the anode and to which an electrolytic solution is supplied, in which at least one of the surface of the cathode side and the surface of the anode side of the solid polymer electrolyte film is hydrophilized.

In the electrolysis cell for producing an organic chemical hydride of the present invention, when the surface of the solid polymer electrolyte film is roughened for hydrophilization, and the maximum height of the roughened surface in conformity with JIS B 0601 may be 30 μm or less. Further, when the surface of the solid polymer electrolyte film is coated with an inorganic substance layer for hydrophilization, the inorganic substance layer may have 30% by mass to 95% by mass of a primary particle having an average particle diameter of 0.005 μm to 10 μm and a coating amount of the inorganic substance layer may be in the range of 0.01 mg/cm² to 10 mg/cm². Further, in the electrolysis cell for producing an organic chemical hydride of the present invention, it is preferable that the primary particle be at least one kind selected from an oxide, a nitride, and a carbide of an element of the fourth, fifth, thirteenth, or fourteenth group of a periodic table. Further, in the electrolysis cell for producing an organic chemical hydride of the present invention, it is preferable that the thickness of the inorganic substance layer be in the range of 1 μm to 80 μm. Here, the average particle diameter means an average particle diameter $D_{50}$ measured by a laser diffraction method.

Effects of the Invention

According to the present invention, oxygen generated in an anode or hydrogen gas generated in a cathode of an organic chemical hydride production apparatus becomes difficult to adhere to an electrolyte film, concentration of the current can be prevented, and an organic compound having an unsaturated bond can be reduced even in the high current. As a result, it is possible to provide an electrolysis cell for producing an organic chemical hydride capable of advancing a reduction reaction in the cathode of the organic compound having an unsaturated bond with high current efficiency and a small electric power consumption unit.

MODE FOR CARRYING OUT THE INVENTION

Hereinafter, embodiments of the present invention will be described in detail with reference to the accompanying figures.

Figure 1:
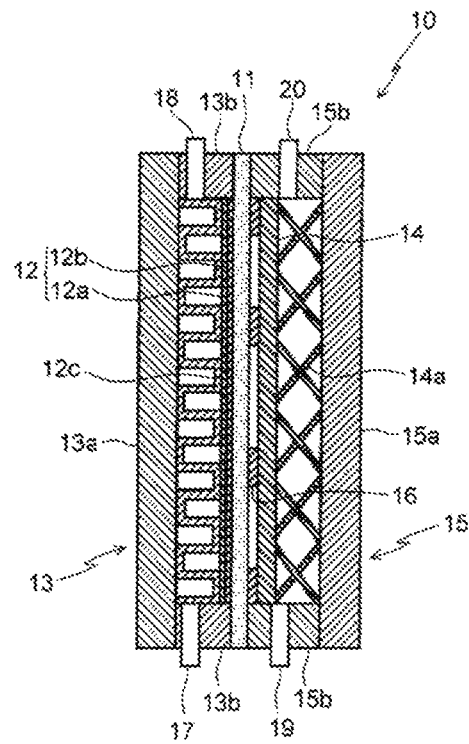
FIG. 1 is a configuration view schematically illustrating an electrolysis cell for producing an organic chemical hydride according to a preferred embodiment of the present invention.

FIG. 1 is a configuration view schematically illustrating an electrolysis cell for producing an organic chemical hydride according to a preferred embodiment of the present invention. An electrolysis cell 10 of the present invention includes a solid polymer electrolyte film (hereinafter, also referred to as an "electrolyte film") 11 which has proton conductivity; a cathode 12 which is provided on one surface of the electrolyte film 11 and generates a hydride by reducing a substance to be hydrogenated; a cathode chamber 13 which accommodates the cathode 12 and to which the substance to be hydrogenated is supplied; an electrode catalyst-containing anode 14 (hereinafter, also simply referred to as an "anode") which is provided on another surface of the electrolyte film 11 and generates a proton by oxidizing water; and an anode chamber 15 which accommodates the anode 14 and to which an electrolytic solution is supplied. In the example of the figure, the cathode 12 includes a cathode substrate 12$a$ and a cathode catalyst layer 12$b$ formed on the surface thereof.

Further, in the example of the figure, the cathode chamber 13 includes a partition plate 13$a$ of an outermost portion and a spacer 13$b$ arranged between a peripheral edge portion of the partition plate 13$a$ and the electrolyte film 11, and a cathode support 12$c$ is interposed between the partition plate 13$a$ and the cathode 12. Moreover, the anode chamber 15 includes a partition plate 15$a$ of an outermost portion and a spacer 15$b$ arranged between a peripheral edge portion of the partition plate 15$a$ and the electrolyte film 11. In addition, an elastic body 14$a$ for supporting an anode is arranged between the partition plate 15$a$ and the anode 14. An anode spacer 16 is arranged between the anode 14 and the electrolyte film 11. In addition, in the example of the figure, an inlet 17 for substance to be hydrogenated is provided in a lower portion of the cathode chamber 13, and a hydride outlet 18 is provided in an upper portion thereof. An acidic electrolytic solution inlet 19 is provided in a lower portion of the anode chamber 15, and an acidic electrolytic solution outlet 20 is provided in an upper portion thereof.

In the electrolysis cell 10 of the present invention, at least one of the surface of the cathode 12 side and the surface of the anode 14 side of the electrolyte film 11 is hydrophilized By employing such a configuration, hydrogen gas generated in the cathode 12 or oxygen gas generated in the anode 14 becomes difficult to adhere to the electrolyte film 11. Therefore, concentration of the current can be prevented, and an organic compound having an unsaturated bond can be reduced even in the high current. In the electrolysis cell 10 of the present invention, as a method of hydrophilization of the surface of the electrolyte film 11, a method of roughening the surface of the electrolyte film 11 and coating the surface of the electrolyte film 11 with an inorganic substance layer can be exemplified. Hereinafter, the configuration of the electrolysis cell of the present invention will be described in detail.

[Solid Polymer Electrolyte Film]

As the electrolyte film 11 used for the electrolysis cell 10 of the present invention, a film made of a fluorine resin material which has excellent long term stability with respect to an oxidation reaction or an organic compound solvent and has sulfonic acid as an ion-exchange group is preferable. The electrolyte film 11 is formed of a material (ionomer) having proton conductivity, selectively conducts protons, and prevents substances from being mixed or diffused between the cathode 12 and the anode 14. The thickness of the electrolyte film 11 is preferably in the range of 5 μm to 300 μm, more preferably 10 μm to 200 μm, and particularly preferably in the range of 20 μm to 100 μm. When the thickness of the electrolyte film 11 is less than 5 μm, a barrier property of the electrolyte film 11 is degraded and cross leak becomes easily generated. Further, when the thickness of the electrolyte film 11 becomes greater than 300 μm, ion transfer resistance becomes extremely large, which is not preferable.

In the electrolysis cell 10 of the present invention, the surface of the electrolyte film 11 may be hydrophilized by being roughened, being coated with an inorganic substance layer, or using the combination of these. By hydrophilizing the surface of the electrolyte film 11, it is possible to prevent gas generated in the cathode 12 or the anode 14 from being adhered to the surface of the electrolyte film 11. A hydrophilization treatment may be applied to one surface or both surfaces of the anode side and the cathode side of the electrolyte film 11. In this case, it is possible to prevent accumulation of hydrogen gas which can be generated in the cathode 12 in the electrolyte film 11 or in a cathode porous material described below, and to improve electrolytic performance and selectivity.

Here, the mechanism of preventing adhesion of gas to the electrolyte film 11 will be described. In droplets on the solid surface, when a solid (S), a liquid (L), and a vapor (V) are coexisted and in equilibrium, a Young's formula is satisfied with respect to surface tension γ.

$\gamma SV = \gamma SL + \gamma LV \cos \theta$, θ: contact angle of the liquid with respect to the solid A large surface with a contact angle θ of 90° or more when water is used as a liquid is referred to as hydrophobicity and the surface with a contact angle θ of approximately 0 is referred to as hydrophilization. In a case where the surface is uniform, but the surface is geometrically ununiform and roughened, a Wenzel formula is satisfied between an apparent contact angle θ' and an actual contact angle.

$\cos \theta' = r \cos \theta$, r: actual surface area/apparent surface area≥1

This means that when θ is larger than 90°, θ is smaller than θ', that is, a surface which is hardly wet becomes harder to be wet in a case where the surface is made to be rough; and when θ is smaller than 90°, θ is larger than θ', that is, a surface which is easily wet becomes easier to be wet in a case where the surface is made to be rough. Since the contact angle θ of water to a commercially available ion-exchange film is 90° or smaller, when the surface of the ion-exchange film is roughened, the surface becomes easily wet according to the latter described above. Therefore, it is assumed that oxygen gas generated in the anode 14 through water electrolysis becomes difficult to adhere to the film surface. Similarly, since the contact angle of an organic solution to the film in the cathode 12 is also 90° or smaller, it is assumed that adhesion of generated hydrogen to the film surface can be effectively prevented.

As a method of roughening the surface of the electrolyte film 11, a method of polishing the surface of the electrolyte film 11 by the range of 0.001 μm to 10 μm using emery paper or a paste-like polishing agent is exemplified. In regard to the emery paper or the polishing agent, for example, paper No. 2000 may be used as the emery paper and an agent having an abrasive grain size of 0.3 μm may be used as the polishing agent. The maximum height which is the surface roughness of the surface of the electrolyte film 11 is preferably 30 μm or less, more preferably 0.01 μm or more, and 15 μm or less. Here, the maximum height means the maximum height in conformity with JIS B 0601.

In a case where the surface of the electrolyte film 11 is coated with an inorganic substance layer, it is preferable that an inorganic substance layer containing 30% by mass to 95% by mass of at least one kind of inorganic substance particles in which the average particle diameter of the primary particle is in the range of 0.005 μm to 10 μm and preferably in the range of 0.01 μm to 0.015 μm be used. In this case, it is preferable that the surface thereof be coated with the inorganic substance layer in the range of approximately 0.01 mg to 10 mg per 1 $cm^2$. Preferably, the inorganic substance layer is made of 5% by mass to 70% by mass of a binder having a fluorine-based polymer with hydrophilicity and 30% by mass to 95% by mass of inorganic substance particles.

As the primary particles constituting the inorganic substance layer, at least one kind selected from an oxide, a nitride, and a carbide of an element of the fourth, fifth, thirteenth, or fourteenth group of a periodic table is preferable. Particularly, an oxide, a nitride, or a carbide of zirconium, silicon and titanium is preferable.

In the electrolysis cell 10 of the present invention, the thickness of the inorganic substance layer of the electrolyte film 11 surface is preferably in the range of 1 μm to 80 μm and more preferably in the range of 5 μm to 30 μm. This is because the effect due to hydrophilization is not substantially changed when the thickness of the inorganic substance layer becomes larger than 80 μm and the effect due to hydrophilization cannot be sufficiently obtained when the thickness of the inorganic substance layer is less than 1 μm.

In the electrolysis cell 10 of the present invention, the anode 14, the cathode 12, and the electrolyte film 11 may be in close contact to one another. However, a gap may be formed between the anode 14 and the electrolyte film 11 as described in the figure by arranging the anode spacer 16 between the electrolyte film 11 and the anode 14. Further, a gap may be formed between the cathode 12 and the electrolyte film 11 in the same manner.

[Cathode]

In the electrolysis cell 10 of the present invention, as described in the figure, the cathode 12 can be formed of the cathode substrate 12a and the cathode catalyst layer 12b. As the cathode substrate 12a constituting the cathode 12 of the electrolysis cell 10 of the present invention, a fiber sintered body or the like such as cloth or paper made of carbon, which is a porous conductive substrate, can be used. The reason for using a porous conductive substrate is that it is preferable to have an appropriate level of porosity in order to supply or remove gas and a liquid and to maintain sufficient conductivity. Particularly, it is preferable that the thickness of the porous conductive substrate be in the range of 0.01 mm to 5 mm, the porosity thereof be in the range of 30% to 95%, and the typical pore size thereof be in the range of 0.001 mm to 1 mm. Further, when a metal component is allowed to be coexisted in the surface of the cathode substrate 12a, the conductivity of the entire conductive layer is improved and the current is uniformized, which is preferable.

Carbon cloth is obtained by making thin carbon fibers having diameters of several μm into a bundle of several hundred fibers to be a woven fabric. It is preferable as the cathode substrate 12a because of excellent gas and liquid permeability. Further, carbon paper is obtained using carbon raw material fibers as a precursor with a thin film through a paper producing method and sintering the precursor, and can be favorably used. When electric power is directly supplied to a carbon conductive substrate, the current is locally concentrated due to insufficient conductivity, and the current locally concentrated is supplied to a gas diffusion layer or a reaction layer to decrease electrolysis efficiency. However, the current can be uniformly supplied to a conductive substrate by allowing a metal component to be coexisted.

[Cathode Catalyst]

As the kind of the cathode catalyst, particles of a metal selected from platinum, ruthenium, palladium, iridium, or an alloy thereof can be used. Commercially available particles of these metals may be used, but particles synthesized according to a known method can be used. For example, a wet method of mixing a reducing agent to an aqueous solution that dissolves a catalyst metal ion to be synthesized may be employed, or a dry method such as depositing or sputtering may be employed. The particle diameter of particles of the cathode catalyst is preferably in the range of 0.001 μm to 1 μm.

The cathode catalyst particles are not required to be carried by the cathode substrate 12a. Carbon particles are used as carrier particles to be expanded to the particles so that the surface area of the catalyst can be effectively widened. As the carrier particles, carbon fine particles are generally used, and furnace black or acetylene black can be used. The particle diameter of the carbon fine particles is preferably in the range of 0.01 μm to 1 μm. Conductive powder in a reactive layer has a function of suppressing aggregation of hydrophilic catalyst particles.

[Production of Cathode]

A method of producing the cathode 12 is not particularly limited. For example, catalyst component powder, a hydrophobic resin, a solvent such as water and naphtha, and a dispersion liquid DE521 (manufactured by DuPont) of Nafion (registered trademark), which is an ionomer, are mixed such that the ratio of the mass of the Nafion after drying to the carbon mass in the catalyst is in the range of 1:10 to 10:1. Then a catalyst ink for coating is prepared using an appropriate solvent. Subsequently, the cathode substrate 12a is coated with the catalyst ink, and particles of a cathode catalyst may be fixed to the cathode substrate 12a through drying and firing. The ionomer of the Nafion dispersion liquid is effective for maintaining an electron transfer reaction in an organic hydrogen compound with no conductivity in the inside of a porous structure. A hydrophobic resin (fluorine component) is a gas permeability material, and the particle diameter of the powder thereof is preferably in the range of 0.005 μm to 10 μm. When coating, drying, and firing are performed by dividing the processes into several times, the homogeneous cathode catalyst layer 12b can be obtained, which is preferable. The cathode 12 having the cathode catalyst layer 12b can be prepared in this manner.

In the electrolysis cell 10 of the present invention, a cathode catalyst layer may be formed on the electrolyte film 11 using a catalyst ink component. A cathode catalyst layer may be formed on one surface of the electrolyte film 11 using a bar coater coating method to be used as a cathode electrolyte film complex. The catalyst ink can be applied on the electrolyte film 11 by spray coating such that the total mass of Pt and Ru in the catalyst becomes 0.5 mg/$cm^2$ per electrode area, and a solvent component in the ink is dried, and then a joined body of the electrolyte film and the catalyst can be obtained.

Since the cathode substrate 12a is used adding a pressure in the thickness direction, the conductivity in the thickness direction is changed, which is not preferable. For a purpose of improving the performance and setting the cathode to have a filling ratio of 20% to 50%, a pressing process is preferably performed. The pressing process is performed for improving the conductivity through compression of a carbon material and stabilizing the filling ratio and the change in conductivity when used by adding the pressure. Improvement of the joint degree between the cathode catalyst layer 12b and the cathode substrate 12a contributes to improvement of the conductivity. Further, supply of a raw material substance and removal capability of a generated substance are increased through the improvement of compression of the cathode substrate 12a and the reaction layer and the joint degree between the cathode catalyst layer 12b and the cathode substrate 12a. As a pressing process apparatus, a known apparatus such as a hot press or a hot roller can be used. Desirably, as the condition of pressing, pressing is performed under a temperature range of room temperature to 360° C. and a pressure range of 0.1 MPa to 5 MPa. From the above description, it is possible to produce the cathode 12 having high conductivity and reactivity.

[Anode]

As an anode substrate constituting the anode 14 of the electrolysis cell 10 of the present invention, a plate-like material having a thickness of 0.1 mm to 2 mm is preferable in terms of sufficient electrical conductivity for circulating the current necessary for electrolysis and necessity of mechanical strength constituting the electrolysis cell 10. In order to avoid increase in resistance due to bubbles and to accelerate supply of an electrolytic solution, it is preferable that a gas generating electrode be a porous body and have excellent corrosion resistance with respect to an acidic electrolyte and titanium expanded mesh is widely used. The structure becomes a three-dimensional structure after a meshing process, a smoothing process is appropriately performed. Preferably, an optimal thickness of the expanded mesh is in the range of 0.1 mm to 2 mm, the distance between centers in the short direction is in the range of 0.1 mm to 4 mm, the distance between centers in the long direction is in the range of 0.1 mm to 6 mm, and the opening ratio is in the range of approximately 30% to 70%.

[Production of Anode]

Preferably, as the production of the anode 14, a dry blasting treatment is performed on the surface of titanium which becomes an anode substrate and then a washing treatment is performed in an aqueous solution, for example, 20% sulfuric acid. Next, a titanium-tantalum layer is formed on the surface of the washed anode 14 using an arc ion plating apparatus. This is because the layer suppresses corrosion of the titanium substrate during electrolysis. The thickness of the titanium-tantalum layer is preferably in the range of 0.1 μm to 10 μm. Thereafter, operations for applying a mixed aqueous solution that dissolves iridium (Ir) and tantalum components and performing a heat treatment using an electrical furnace in a temperature range of 360° C. to 550° C. are repeated for plural times. Thereby, it is possible to produce an anode. For the anode of the electrolysis cell of the present invention, an anode 14 in which an electrolysis catalyst layer made of iridium oxide and tantalum oxide is formed so as to have an amount of 1 $g/m^2$ to 40 $g/m^2$ in terms of an Ir metal amount per electrode area can be appropriately used.

[Cell Structure]

The partition plate 13a having electron conductivity is arranged in the outermost portion of the cathode chamber 13 of the electrolysis cell 10 of the present invention as shown in FIG. 1. The partition plate 13a is made of a metal such as stainless, for example. The spacer 13b is mounted between the peripheral edge portion of the partition plate 13a and the electrolyte film 11 such that a space surrounded by the partition plate 13a, the spacer 13b, and the electrolyte film 11 is the cathode chamber 13. The spacer 13b has a function as a seal material that prevents leakage of an organic substance containing a substance to be hydrogenated and a hydride to the outside of the cathode chamber 13 and desirably has an electronically insulating property. Examples of materials of the spacer 13b include a tetrafluoroethylene resin.

In the example of the figure, the inlet 17 for substance to be hydrogenated is provided in the lower portion of the spacer 13b. The substance to be hydrogenated such as toluene is supplied from the inlet 17 for substance to be hydrogenated to the cathode chamber 13. Further, the hydride outlet 18 is provided on the upper portion of the spacer 13b such that an organic substance containing a hydride such as methyl cyclohexane which is a hydride of toluene is discharged into the outside of the system through the hydride outlet 18.

Further, in the example of the figure, the cathode support 12c is arranged between the partition plate 13a and the cathode 12. The cathode support 12c, which will be described later, receives the pressure pressurized by the elastic body 14a for supporting an anode and secures the electron conductivity between the partition plate 13a and the cathode 12. Further, the cathode support 12c forms a channel that controls the flow of the substance to be hydrogenated and the hydride.

The partition plate 15a having electron conductivity is arranged in the outside of the anode chamber 15 of the electrolysis cell 10 of the present invention. The partition plate 15a is made of a metal such as titanium, for example. The spacer 15b is mounted between the peripheral edge portion of the surface of the anode 14 side of the partition plate 15a and the electrolyte film 11. A space surrounded by the partition plate 15a, the spacer 15b of the end portion of the anode chamber 15 side, and the electrolyte film 11 is the anode chamber 15. The spacer 15b has a function as a seal material that prevents leakage of an acidic electrolytic solution to the outside of the anode chamber 15 and desirably has an electronically insulating property. Examples of materials of the spacer 15b include a tetrafluoroethylene resin.

In the example of the figure, an acidic electrolytic solution inlet 19 is provided in the lower portion of the spacer 15b, and the acidic electrolytic solution is supplied to the anode chamber 15 from the acidic electrolytic solution inlet 19. Examples of the acidic electrolytic solution include sulfuric acid, phosphoric acid, nitric acid, and hydrochloric acid having an ionic conductivity of 0.01 S/cm or more, which is measured at a temperature of 20° C. When the ion conductivity of the acidic electrolytic solution is smaller than 0.01 S/cm, an electrochemical reaction becomes hard to be sufficiently obtained industrially. The acidic electrolytic solution outlet 20 is provided in the upper portion of the spacer 15b. The acidic electrolytic solution stored in the anode chamber 15 is discharged into the outside of the system through the acidic electrolytic solution outlet 20.

Moreover, in the example shown in the figure, the elastic body 14a for supporting an anode is arranged between the anode 14 and the partition plate 15a such that the anode 14 is pressurized to the electrolyte film 11 by the elastic body 14a for supporting an anode. The elastic body 14a for supporting an anode is formed of, for example, an electron conductor having a structure of a plate spring or a coil. In the example of the figure, the anode spacer 16 is interposed between the anode 14 and the electrolyte film 11 and it is configured such that a predetermined gap is maintained between the anode 14 and the electrolyte film 11 by the anode spacer 16. In this manner, it is possible to facilitate maintenance work such as exchange of the anode 14 by preparing a structure in which the elastic body 14a for supporting an anode is provided between the anode 14 and the partition plate 15a constituting the anode chamber 15 to hold the anode 14.

It is preferable that the elastic body 14a for supporting an anode be formed of a material having acid resistance with respect to the acidic electrolytic solution flowing in from the acidic electrolytic solution inlet 19. Titanium or a titanium alloy is preferably used as a substrate. As an elastic body structure constituting the elastic body 14a for supporting an anode, various structures such as a V-shaped spring, an X-cross spring, a cushion coil, or an aggregate of fibers produced by chatter vibration cutting method are considered. In light of the necessary surface pressure and contact resistance of each member, the thickness of a material or the like is appropriately selected.

EXAMPLES

Hereinafter, examples of the present invention will be described in detail, but the examples are merely examples for describing the present invention preferably and do not limit the present invention.

Example 1

A zirconium oxide layer having a thickness of 5 µm was formed on the surface of an anode side of NRE212CS (thickness: 25 µm, manufactured by DuPont) as an electrolyte film for hydrophilization. For forming a cathode catalyst layer on the surface of a cathode side of the electrolyte film, first, a dispersion liquid DE521 (manufactured by DuPont) of an ionomer Nafion (registered trademark) was added to powder of PtRu/C catalyst TEC61E54E (Pt: 23% by mass, Ru: 27% by mass, manufactured by Tanaka Kikinzoku Kogyo) such that the ratio of the mass of the Nafion after drying to the carbon mass in the catalyst was 4:5, and then an ink for coating was prepared appropriately using a solvent. The electrolyte film was coated with the ink by spray coating such that the total mass of Pt and Ru in the catalyst became 0.5 mg/cm$^2$ per electrode area, and then a solvent component in the ink was dried at a temperature of 70° C. to obtain a cathode catalyst layer, thereby preparing a joined body of a cathode catalyst layer and an electrolyte film.

A cathode diffusion layer SGL35BC (manufactured by SGL CARBON JAPAN Co., Ltd.) which was cut out according to the electrode surface was adhered to the surface of the cathode catalyst layer of the obtained joined body of a cathode catalyst layer and an electrolyte film. A treatment was applied at 120° C. and 1 MPa for 2 minutes, thereby forming a cathode electrolyte film complex.

As a structure of bonding a cathode partition plate and a cathode support, a carbon-based structure obtained by molding a carbon/epoxy resin was used. The cathode support portion of this structure has a plurality of channels for circulating a liquid on the surface in contact with the cathode diffusion layer. One channel had a void portion having a width of 1 mm and a channel height of 0.5 mm. The channels had a straight shape with an interval of 1 mm between channels. The channels were parallel with the perpendicular direction at the time when an organic chemical hydride production apparatus was disposed. Further, both ends of the channel of the structure had a liquid header for integrating the plurality of channels and supplying and discharging a liquid. The channels were connected to paths for supplying and discharging an organic substance through the liquid header.

As an anode substrate, an expanded mesh having a thickness of 1.0 mm, a distance between centers in the short direction of 3.5 mm, and a distance between centers in the long direction of 6.0 mm was used. The surface of the anode substrate was subjected to a dry blasting treatment and then a washing treatment in a 20% sulfuric acid aqueous solution. Next, the washed surface of the anode substrate was coated to have a coating thickness of 2 µm at a substrate temperature of 150° C. and a vacuum degree of 1.3 Pa using an arc ion plating apparatus and a titanium-tantalum alloy plate. The operations for applying a mixed aqueous solution of iridium tetrachloride and tantalum pentachloride to the anode substrate obtained in this manner, and performing a heat treatment using an electrical furnace at a temperature of 550° C. are repeated for plural times. Thereby, an anode in which an electrode catalyst layer made of iridium oxide and tantanlum oxide was formed such that an Ir metal amount per electrode area became 12 g/m$^2$ is obtained.

An elastic body in a form of arranging flat springs having a pitch of 10 mm, which is obtained by processing a Ti plate having a thickness of 0.3 mm, was used as an elastic body for supporting an anode. A small amount of platinum layer was formed on the anode contact surface of the flat spring.

These cell members, that is, a cathode support, a joined body of a cathode and an electrolyte film, an anode, and an elastic body for supporting an anode were laminated in this order, and the elastic body for supporting an anode was inserted between the partition plate on the anode side and the anode. Thereby, each layer was pressurized in a close contact with each other by a pressing force from the anode side within a fixed cell width. The thickness of the anode spacer was set to 25 µm.

Toluene was circulated into the cathode chamber of the electrolysis cell obtained in this manner from the bottom to the top (riser) along the perpendicular direction. A 5% sulfuric acid aqueous solution was circulated into a void portion (anode chamber) between the anode and the partition plate on the anode side in the manner of riser. A negative electrode of a constant voltage power supply was connected to the cathode, and a positive electrode thereof was connected to the anode, and then the following electrolysis reaction was performed. The circulation flow rate of these fluids was set such that the cathode side was 1 m/min and the anode side was 3 m/min as a linear speed.

Example 2

The electrolysis cell was the same as that of Example 1 except that the surface on the anode side of the electrolyte film was roughened for hydrofilization. The maximum height of the roughness was 10 µm.

Example 3

The electrolysis cell was the same as that of Example 1 except that the surface on the anode side of the electrolyte film was polished with emery paper No. 2000, and then a zirconium oxide layer having a thickness of 5 µm was formed thereon for hydrophilization. The maximum height of the roughness was 15 µm.

Comparative Example 1

The electrolysis cell was the same as that of Example 1 except that the hydrophilization treatment was not performed.

Comparative Example 2

The electrolysis cell was the same as that of Example 1 except that the hydrophilization treatment was not performed and the thickness of the spacer was set to 50 µm.

Comparative Example 3

The electrolysis cell was the same as that of Example 1 except that the hydrophilization treatment was not performed and the thickness of the spacer was set to 200 μm.

(Performance Evaluation)

Figure 2:
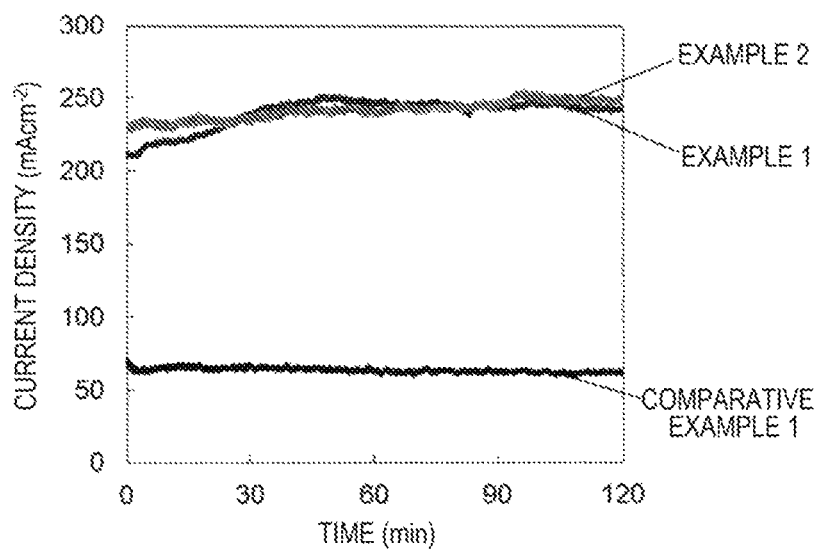
FIG. 2 is a graph showing chronological change of the current density of the electrolysis cell of Examples 1 and 2 and chronological change of the current density of the electrolysis cell of Comparative Example 1 when an output voltage of the constant voltage power supply is set to 2.0 V.

FIG. 2 is a graph showing chronological change of the current density of electrolysis cell of Examples 1 and 2 and chronological change of the current density of the electrolysis cell of Comparative Example 1 when an output voltage of the constant voltage power supply is set to 2.0 V. Regardless of the same voltage, the current densities in Examples 1 and 2 were higher than that of Comparative Example. Further, significant decrease in voltage was recognized at the initial stage in Comparative Example 1. It was considered that the high current density was obtained without local current concentration on the electrolyte film and increase in overvoltage associated with by gas-blocking on the anode side because oxygen gas generated on the anode side was escaped to the upper portion without being adhered to the electrolyte film in Examples 1 and 2 compared to Comparative Example 1. Further, in Examples 1 and 2, instantaneous hydrogen generation (decrease in faraday efficiency with respect to reduction of an organic substance) due to instability of a potential on the cathode side was not observed, and it was confirmed that the cathode reaction advanced preferably because the state of the anode during the electrolysis reaction was favorable.

Figure 3:
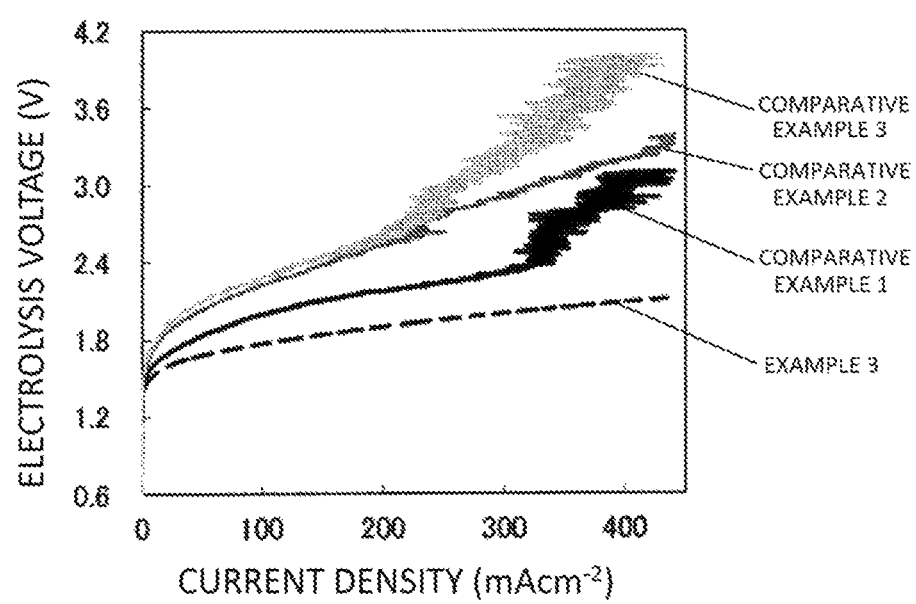
FIG. 3 is a graph showing the current density of the electrolysis cell of Example 3 and the current density of the electrolysis cell of Comparative Examples 1 to 3 when the electrolysis voltage is swept from 0.6 V to 3.8 V.

FIG. 3 is a graph showing the current density of the electrolysis cell of Example 3 and the current density of the electrolysis cell of Comparative Examples 1 to 3 when the electrolysis voltage is swept from 0.6 V to 3.8 V. In Example 3, the voltage was low from a low current range to a high current range. In contrast, in Comparative Examples 2 and 3, the cell voltage was drastically increased while the current was vibrated at a current density of 200 mA/cm$^2$ or more. The reason for this is considered due to oxygen bubbles generated in the anode. The vibration of the cell voltage was not observed until the current density exceeds 300 mA/cm$^2$ in the polarization curve of Comparative Example 1 in which the spacer of 25 μm was placed and the electrolyte film was hydrophilized. Therefore, it is considered that, by hydrophilizing the electrolyte film, adhesion of oxygen generated in the anode or a small amount of hydrogen generated in the cathode to the electrolyte film was suppressed, discharge of the gas was accelerated, the resistance was decreased, the reaction concentration due to bubbles was suppressed, and the overvoltage was decreased, the voltage of the electrolysis cell was decreased.

Example 4

Hydrophobic carbon black (AB-6, manufactured by Denki Kagaku Kogyo Co., Ltd.) and a PTFE suspension (31JR, manufactured by Mitsui Fluorochemicals Co., Ltd.) were mixed with each other, and sufficiently stirred in water in which Triton (registered trademark) whose content was equivalent to 20% by mass was dissolved. Then, carbon cloth (manufactured by Ballard Power System Inc.) having a thickness of 0.4 mm was coated with the obtained mixed suspension such that the mass of the carbon black per projected area became 108 g/m$^2$, thereby obtaining a cathode substrate. Next, Hydrophobic carbon black (AB-6, manufactured by Denki Kagaku Kogyo Co., Ltd.), hydrophilic carbon black (AB-12, manufactured by Denki Kagaku Kogyo Co., Ltd.), Pt—Ru particles, and a Nafion liquid (31JR, manufactured by Mitsui Fluorochemicals Co., Ltd.) were mixed to one another. The cathode substrate having a thickness of 0.5 mm was coated with the mixed suspension such that the catalyst mass per projected area became 0.5 mg/cm$^2$. Subsequently, the cathode substrate was dried at 60° C., fired in an electric furnace at 305° C. for 15 minutes, and subjected to a pressing process at a pressure of 0.6 MPa. Therby, a cathode was prepared such that the filling ratio of a gas diffusion cathode was 40%.

The same electrolysis cell as that of Example 1 was assembled using a hydrophilized film by polishing such that both surfaces of the electrolyte film were roughened to have a height of 2 μm. 10 mL/min of a 1M sulfuric acid aqueous solution was introduced to the anode, and 5 mL/min of toluene was introduced to the cathode. The cell voltage was 2.15 V when the cell temperature was set to 60° C. and the current density was 400 mA/cm$^2$. The cell voltage was not vibrated up to the range of high current density. The current efficiency was 95%.

Example 5

The same electrolysis cell was prepared in the same manner as that of Example 4 except that only the anode side of the electrolyte film was hydrophilized. When performance measurement was performed, the cell voltage was 2.2 V at a current density of 400 mA/cm$^2$. Further, the cell voltage was not vibrated up to the range of high current density. The current efficiency was 95%.

Comparative Example 4

The same electrolysis cell was prepared in the same manner as that of Example 4 except that the electrolyte film was not hydrophilized. When performance measurement was performed, the cell voltage was 2.2 V at a current density of 300 mA/cm$^2$. Further, the cell voltage was vibrated in the range of high current density. The current efficiency was 90%.

The present invention is not limited to the above-described embodiments and various modifications such as changes of the design based on the knowledge of a person skilled in the art can be added, and the embodiments to which such modifications are added are included in the range of the present invention.

DESCRIPTION OF SYMBOLS

10: electrolysis cell for producing organic chemical hydride (electrolysis cell)
11: solid polymer electrolyte film (electrolyte film)
12: cathode
12a: cathode substrate
12b: cathode catalyst layer
12c: cathode support
13: cathode chamber
13a: partition plate
13b: spacer
14: electrode catalyst-containing anode (anode)
14a: elastic body for supporting anode
15: anode chamber
15a: partition plate
15b: spacer
16: anode spacer
17: inlet for substance to be hydrogenated
18: hydride outlet
19: acidic electrolytic solution inlet
20: acidic electrolytic solution outlet

The invention claimed is:

1. An electrolysis cell for producing an organic chemical hydride, comprising:
    a solid polymer electrolyte film which has proton conductivity;
    a cathode which is provided on one surface of the solid polymer electrolyte film and generates a hydride by reducing a substance to be hydrogenated;
    a cathode chamber which accommodates the cathode and to which the substance to be hydrogenated is supplied;
    an electrode catalyst-containing anode which generates a proton by oxidizing water, wherein said anode is provided on another surface of the solid polymer electrolyte film and is separated from the solid polymer electrolyte film by a spacer interposed between the anode and the solid polymer electrolyte film, said spacer being configured to maintain a predetermined gap between the anode and the electrolyte film; and
    an anode chamber which accommodates the anode and to which an electrolytic solution is supplied,
    wherein at least one of a surface of the cathode side and a surface of the anode side of the solid polymer electrolyte film is hydrophilized,
    wherein the surface of the solid polymer electrolyte film is roughened for hydrophilization, wherein the surface of the solid polymer electrolyte film is coated with an inorganic substance layer for hydrophilization, the inorganic substance layer comprising 5% to 70% by mass of a binder having a fluorine-based polymer with hydrophilicity and 30% to 95% by mass of a primary particle having an average particle diameter of 0.005 to 10 μm,
    wherein a coating amount of the inorganic substance layer is in the range of 0.01 to 10 mg/cm$^2$, and
    wherein the thickness of the inorganic substance layer is in the range of 5 μm to 30 μm.

2. The electrolysis cell for producing an organic chemical hydride according to claim 1,
    wherein the maximum height of the roughened surface in conformity with JIS B 0601 is 30 μm or less.

3. The electrolysis cell for producing an organic chemical hydride according to claim 1,
    wherein the primary particle is at least one kind selected from an oxide, a nitride, and a carbide of an element of the fourth, fifth, thirteenth, or fourteenth group of a periodic table.

* * * * *